June 30, 1970     T. F. G. FITZMAURICE     3,517,536
METHOD OF MACHINING THE INSIDE WALL OF A TUBE
Filed June 1, 1967
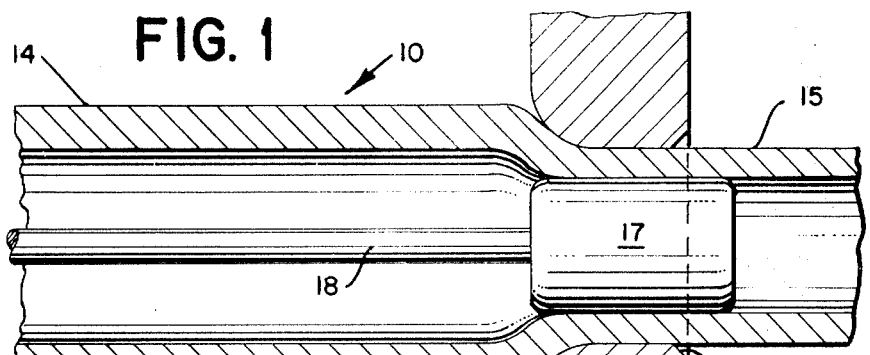
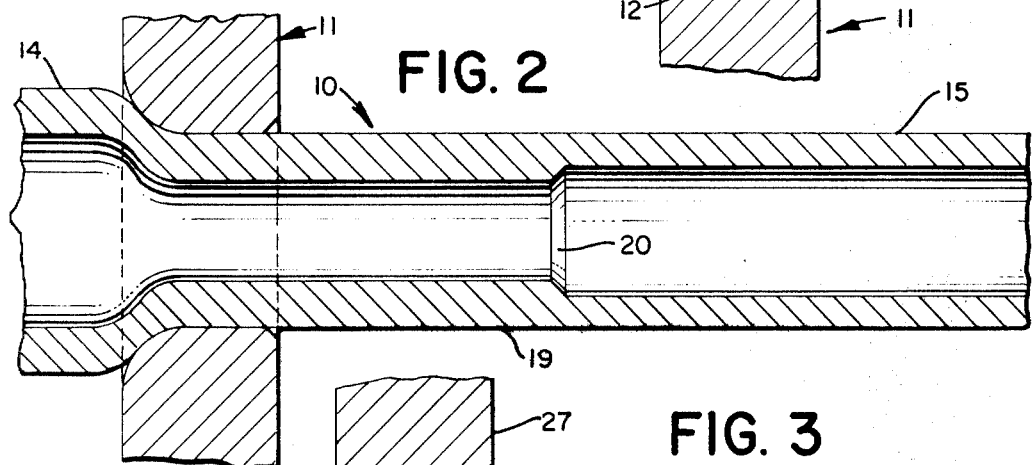
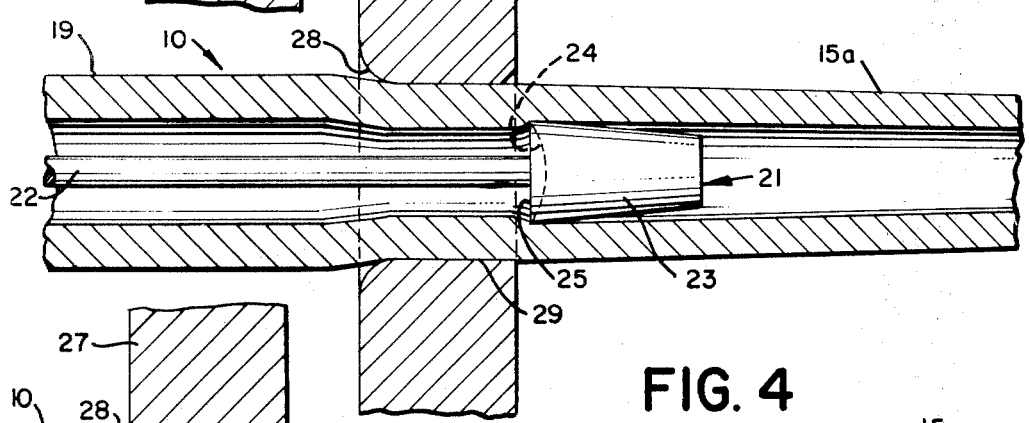
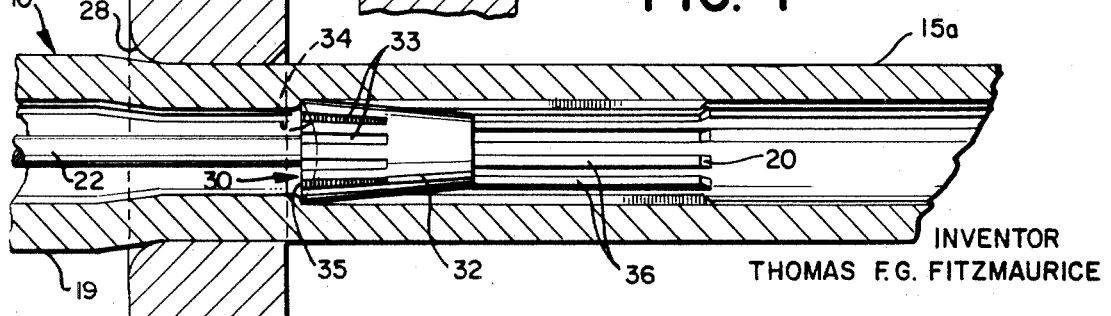
INVENTOR
THOMAS F.G. FITZMAURICE
BY
Pennie, Edmonds, Morton, Taylor & Adams
ATTORNEYS

United States Patent Office 3,517,536
Patented June 30, 1970

3,517,536
METHOD OF MACHINING THE INSIDE WALL OF A TUBE
Thomas F. G. Fitzmaurice, Waterbury, Conn., assignor to Anaconda American Brass Company, a corporation of Connecticut
Filed June 1, 1967, Ser. No. 642,749
Int. Cl. B21c 1/00
U.S. Cl. 72—275                                                       12 Claims

ABSTRACT OF THE DISCLOSURE

A method of manufacturing tubing wherein the outside diameter and the wall thickness of a first portion of the tubing are reduced simultaneously to a dimension slightly larger than that required and then the outside diameter of second portion is reduced to a size equal to that of the first portion, the wall thickness of the second portion being greater than the wall thickness of the first portion. The tubing is then reduced to the required outside diameter and immediately thereafter the interior wall surface is cut to the dimension required. The tubing is then severed at the juncture between the first and second portions and the first portion discarded. Novel apparatus is provided for carrying out the cutting operation on the interior wall surface.

BACKGROUND OF THE INVENTION

Field of the invention

This invention relates to a method and apparatus for manufacturing tubing and more particularly relates to a method and apparatus for machining the interior surfaces of tubing.

The present invention finds particular application in the manufacture of metallic tubing for use in pump cylinder liners and the like where it is desirable to obtain a smooth, flaw-free interior surface machined to close tolerances and in the manufacture of tubing for use in heat exchangers where it is desirable to provide grooves in the interior surface of the tubing to obtain a greater area for increased heat transfer.

Description of the prior art

Seamless tubing generally is manufactured by the conventional plug and die drawing method which comprises drawing the tubing through a confining opening to reduce its outside diameter and simultaneously reducing the wall thickness of the tubing by placing a plug inside the tubing at the same plane as the die. The finished tubing cross-section thus approximates the annular space between the plug and the die. Although the pressure exerted by the plug causes the inner surface to be relatively smooth, many defects are masked because they are "folded over" during the drawing operation. However, these hidden flaws usually manifest themselves during later use and adversely affect service life.

One way to prevent defects on inner surfaces of tubing is to machine the tubing before the drawing operation but this is largely ineffective because flaws usually reappear as the tubing is drawn to size. Another way is to strictly control the quality of the material which makes up the tubing stock but this is an extremely costly undertaking which does not yield perfect results.

Attempts have been made to machine the inner surface of tubing during the later stages of manufacturing operations but these have not been completely effective because the tubing is subjected to a drawing operation by plug and die after the machining operation and flaws will develop in many instances.

SUMMARY OF THE INVENTION

The present invention is a method of manufacturing tubing having a machined interior wall surface. At the outset, tubing is provided which has a substantially greater outside diameter than that required. The outside diameter of a first portion of the tubing is reduced to a dimension slightly greater than the required and simultaneously therewith the wall thickness of the first portion of the tubing is reduced as well. The outside diameter of a second portion of the tubing is then reduced to a dimension equal to that of the first portion without reducing the wall thickness of the second portion, the wall thickness of the second portion being greater than the wall thickness of the first portion and the interior wall surface having a shoulder thereon at the juncture between the first and second portions. Next, the outside diameter of the tubing is reduced to that required and immediately thereafter the interior wall surface of the second portion is cut to the size required. Finally, the first portion of the tubing is removed from the finished product.

The present method has the advantage of producing tubing with an accurately dimensioned flaw-free interior wall surface because the tubing is not subjected to further drawing operations after the interior surface has been so cut or scalped to size. Furthermore, various interior surface configurations may be obtained merely by altering the cutting edge of the scalping tool. Thus, grooves may be machined into the interior wall and spiral grooves may be obtained merely by rotating the tubing about its longitudinal axis as the interior surface is being machined.

The present invention further includes apparatus for machining the interior wall surface of the tubing comprising a die having a flared bearing portion for reducing the outside diameter of the tubing and a cylindrical bearing portion substantially equal in diameter to the required outside diameter of the tubing. A cutting tool, supported inside the tubing, has a cutting edge at one end which is positioned adjacent to and spaced from the cylindrical bearing portion of the die in the direction of travel of the tubing through the die.

BRIEF DESCRIPTION OF THE DRAWINGS

FIG. 1 is a sectonal elevation showing the tubing in a conventional plug-and-die apparatus as the first portion is being drawn;

FIG. 2 is a sectional elevation showing the tubing in a conventional die with the plug removed as the second portion is being drawn;

FIG. 3 is a sectional elevation showing the tubing being drawn to the required outside diameter and the interior of the second portion being machined to the required dimension; and FIG. 4 is a sectional elevation similar to FIG. 3 showing the interior of the second portion being machined with grooves therein.

DESCRIPTION OF THE PREFERRED EMBODIMENT

Referring initially to FIG. 1, a length of seamless tubing 10 which may be of brass, bronze, copper, or any alloy usually employed for these purposes is being drawn through a conventional die 11 which has a flared bearing portion 12 and a cylindrical bearing portion 13. Portion 14 of tube 10 has an outside diameter which is approximately equal to the greatest diameter of the flared bearing portion 12 of die 11 and substantially greater than the diameter of the cylindrical bearing portion 13 of die 11. The diameter of cylindrical bearing portion 13 is slightly greater than that required for the finished product. By drawing the tube 10 through die 11, the outside diameter of portion 14 is decreased by the peripheral force exerted by the flanged bearing portion 12 and cylindrical bearing portion 13 of die 11. Thus, portion 15 of the tube 10 which passes through the die 11 during this first drawing operation has an outside diameter substantially equal to the diameter of the cylindrical bearing section 13 of the die 11.

Simultaneously with the reduction of the outside diameter of portion 15 of tube 10, cylindrical plug 17 which is inserted inside the tube 10 and held by rod 18 in the position shown in FIG. 1, exerts a compressive force which decreases the wall thickness of tube 10. The portion 15 of tube 10 thus assumes a cross-sectional configuration which is substantially the same as the annular gap between the cylindrical bearing portion 13 of die 11 and the plug 17.

After about one foot of length of tube 10 is passed through die 11, plug 17 is removed and as shown in FIG. 2, the remainder of tube 10 is passed through die 11. Consequently, the wall thickness of a portion 19 of the tube 10 which is drawn through the die 11 after plug 17 has been removed is greater than the wall thickness of portion 15 of tube 10 which was drawn through die 11 prior to the removal of plug 17. Thus, a shoulder 20 is formed on the inner surface of tube 10 at the juncture between portions 15 and 19. As will be explained below, portion 15 of tube 10 is to be removed and discarded upon completion of the mnaufacturing process. Therefore, in the interest of economy, it is desirable to keep the length of portion 15 to a minimum.

Prior to a second and final drawing operation a cutting tool 21, which is mounted on a rod 22, is inserted into portion 15 of tube 10 as shown in FIG. 3. The cutting tool 21 illustrated herein includes a truncated conical surface 23 and a hemispherical depression 24 at the larger end. The intersection between the conical surface 23 and the hemispherical depression 24 defines a circular cutting edge 25. The greatest diameter of the cutting tool 21 is slightly less than the inside diameter of the thicker walled portion 19 of tube 10 to allow for the insertion of cutting tool 21.

When the cutting tool 21 is positioned with cutting edge 25 adjacent shoulder 20, portion 15 of tube 10 is swaged to a dimension 15a to allow passage of the tube 10 through second die 27. The second die 27 has a flared bearing portion 28 the greater diameter of which is substantially equal to the outside diameter of portion 19 of tube 10, and a cylindrical bearing portion 29 the diameter of which is substantially equal to the required outside diameter of tube 10. The reduction of the outside diameter of tube 10 in the second drawing operation is generally very slight because the primary purpose of this operation is to reduce the inside diameter of the thicker walled portion 19 of the tube 10 to just less than the diameter of the cutting edge 25 of cutting tool 21 so that the interior surface of tube 10 may be machined to the required dimension.

In the second drawing operation, portion 15a of tube 10 is slipped through second die 27 and the cutting tool 21 is thereafter drawn through until the cutting edge 25 is position adjacent to and spaced from the cylindrical bearing portion 29 as shown in FIG. 3. The cutting tool 21 is maintained in that position by securing rod 22 which is longer than the total length of tube 10. As portion 19 of tube 10 is drawn through second die 27, it is reduced slightly in outside diameter to the required dimension and because a plug is not used, the inside diameter of portion 19 of tube 10 is likewise decreased until it is slightly smaller than the diameter of cutting edge 25 of cutting tool 21. The amount of diameter reduction will depend on the depth of the cut desired which in turn will vary with the materials employed and the required surface characteristics. As portion 19 of the tube 10 emerges from the second die 27, cutting edge 25 of cutting tool 21 removes the outermost layer of the interior surface of tube 10 which contains the defects and at the same time accurately machines the interior surface to the required diameter. The conical configuration assures that no portion of the cutting tool 21 other than cutting edge 25 comes into contact with the interior surface of tube 10. The interior surface thus achieved is substantially flawless and precisely dimensioned.

Heat exchanger tubing or other tubing having a grooved interior surface may be produced by the present method by employing a cutting tool having an appropriate cutting edge configuration. As shown in FIG. 4, cutting tool 31 includes a truncated conical surface 32 upon which are a plurality of circumferentially spaced grooves 33. The larger end of tool 31 defines a hemispherical depression 34. The intersection between the hemispherical depression 34 and the grooved conical surface 32 defines a cutting edge 35 which is suitably configured to impart grooves 36 to the interior surface of portion 19 of tube 10. Spiral grooves may be achieved by rotating tube 10 with respect to cutting edge 35 as it is passed through die 27 during the final drawing operation.

It is apparent that any desired interior surface may be obtained by designing a cutting tool with the appropriate cutting edge configuration. The interior surface characteristics may be closely controlled because the tube 10 undergoes no further deformation subsequent to the cutting operation. In fact all that need be done after the interior surface is cut, is to remove and discard portion 15 of tube 10.

I claim:

1. A method of manufacturing tubing having a machined interior wall surface comprising the steps of
    (a) providing tubing of substantially larger diameter than that required;
    (b) reducing the outside diameter of a first portion of the tubing to a dimension slightly greater than that required and simultaneously reducing the wall thickness of the first portion of the tubing;
    (c) reducing the outside diameter of a second portion of the tubing to a dimension equal to that of the first portion of the tubing, the wall thickness of the second portion being greater than the wall thickness of of the first portion, and the interior wall surface having a shoulder thereon at the juncture between the first and second portions; and
    (d) further reducing the outside diameter of the second portion of the tubing to that required and immediately thereafter cutting the interior wall surface of the second portion of the tubing to the size required.

2. A method of manufacturing tubing according to claim 1 further including swaging the first portion of the tubing prior to step (d) to a diameter slightly less than that required.

3. A method of manufacturing tubing according to claim 1 wherein grooves are imparted to the interior wall surface during step (d).

4. A method of manufacturing tubing according to claim 3 wherein one of the tubing and cutting tool is rotated about its longitudinal axis relative the other during step (d).

5. A method of manufacturing tubing according to claim 1 wherein during steps (b) and (c) a first drawing operation reduces the outside diameter of the first and second portions of the tubing to a dimension slightly greater than that required.

6. A method of manufacturing tubing according to claim 5 wherein a plug is inserted in the tubing during a first part of the first drawing operation to reduce the wall thickness of the first portion of the tubing.

7. A method of manufacturing tubing according to claim 6 wherein the plug is removed from the tubing during a second part of the first drawing operation to form the shoulder on the interior wall surface.

8. A method of manufacturing tubing according to claim 7 wherein during step (d) a second drawing operation further reduces the outside diameter of the tubing to that required.

9. A method of manufacturing tubing according to claim 8 wherein prior to the second drawing operation a cutting tool is inserted in the tubing adjacent the shoulder to cut the interior wall surface to the size required immediately after the second drawing operation.

10. A method of manufacturing tubing according to claim 1 wherein the first portion of the tubing is drawn between a first die and a cylindrical plug to reduce the outside diameter of the first position to a dimension slightly greater than that required and to reduce the wall thickness of the first portion.

11. A method of manufacturing tubing according to claim 10 wherein the cylindrical plug is removed from within the tubing prior to drawing the second portion of the tubing through the first die to form the shoulder on the interior surface of the tubing.

12. A method of manufacturing tubing according to claim 11 wherein the tubing is drawn through a second die to further reduce the outside diameter to that required and immediately thereafter is passed over a cutting tool to cut the interior wall surface to the size required.

References Cited

UNITED STATES PATENTS

| 2,852,835 | 9/1958 | Harvey et al. | 29—1.1 |
| 2,183,861 | 12/1939 | Cotter | 72—275 |
| 2,240,456 | 4/1941 | Darner | 72—276 |
| 2,548,702 | 4/1951 | Chamberlain | 72—342 |

FOREIGN PATENTS

| 936,084 | 11/1955 | Germany. |
| 8,822 | 8/1965 | Japan. |

CHARLES W. LANHAM, Primary Examiner

A. L. HAVIS, Assistant Examiner

U.S. Cl. X.R.

72—340; 29—157.3, 202